United States Patent [19]

Strässle

[11] Patent Number: 4,848,952
[45] Date of Patent: Jul. 18, 1989

[54] ROTARY CONNECTOR FOR SCAFFOLDING ROD

[75] Inventor: Marcel Strässle, Kirchberg, Switzerland

[73] Assignee: Syma Intercontinental AG, Kirchberg, Switzerland

[21] Appl. No.: 197,243

[22] Filed: May 23, 1988

[30] Foreign Application Priority Data

May 26, 1987 [CH] Switzerland .......................... 2052/87
Sep. 3, 1987 [CH] Switzerland .......................... 3380/87
Apr. 21, 1988 [CH] Switzerland .......................... 1490/88

[51] Int. Cl.⁴ .............................................. F16B 7/00
[52] U.S. Cl. ..................................... 403/171; 403/176
[58] Field of Search ......................... 403/171, 172, 176

[56] References Cited

U.S. PATENT DOCUMENTS 4,677,804 7/1987 Holt ............................... 403/171 X

FOREIGN PATENT DOCUMENTS 539924 2/1956 Italy ..................................... 403/171
676701 8/1979 U.S.S.R. ............................. 403/171

Primary Examiner—Andrew V. Kundrat
Attorney, Agent, or Firm—Sughrue, Mion, Zinn, Macpeak and Seas

[57] ABSTRACT

A connecting element for a scaffolding framework rod has a bolt 141 rotatably mounted on one end of the rod, and a guide sleeve 151 with an axial through-bore into which a section of the bolt extends. The bolt is connected to a screw insert 161 guided by a pin 171 which rides in a slot 152 of the sleeve, and a spring 172 urges the guide sleeve against a sleeve insert 130, 121 mounted on the end of the rod.

9 Claims, 8 Drawing Sheets

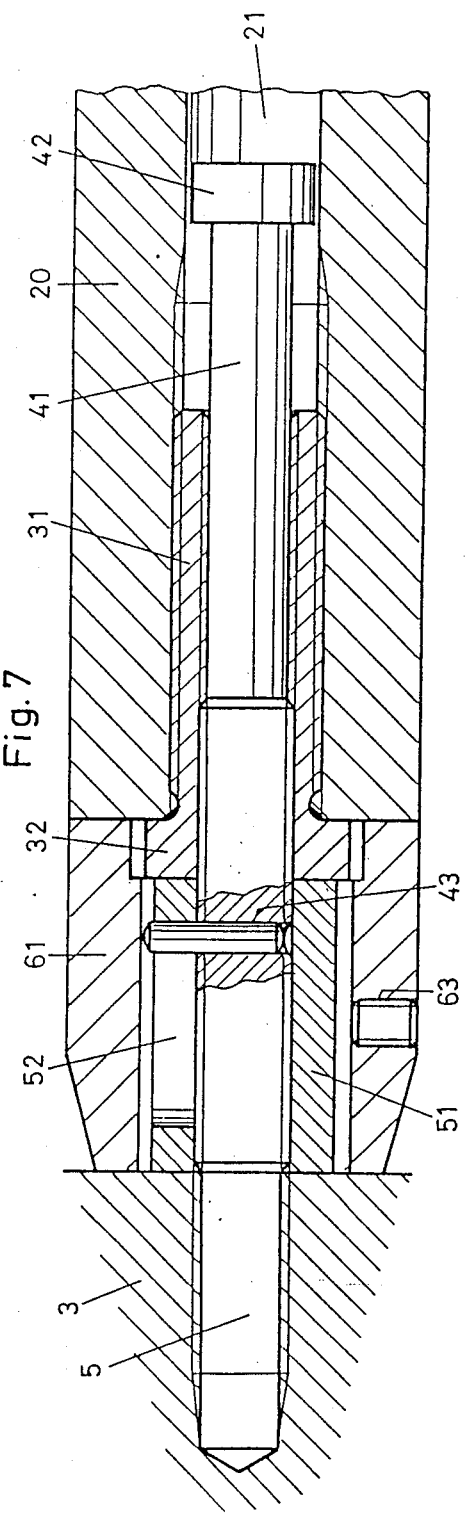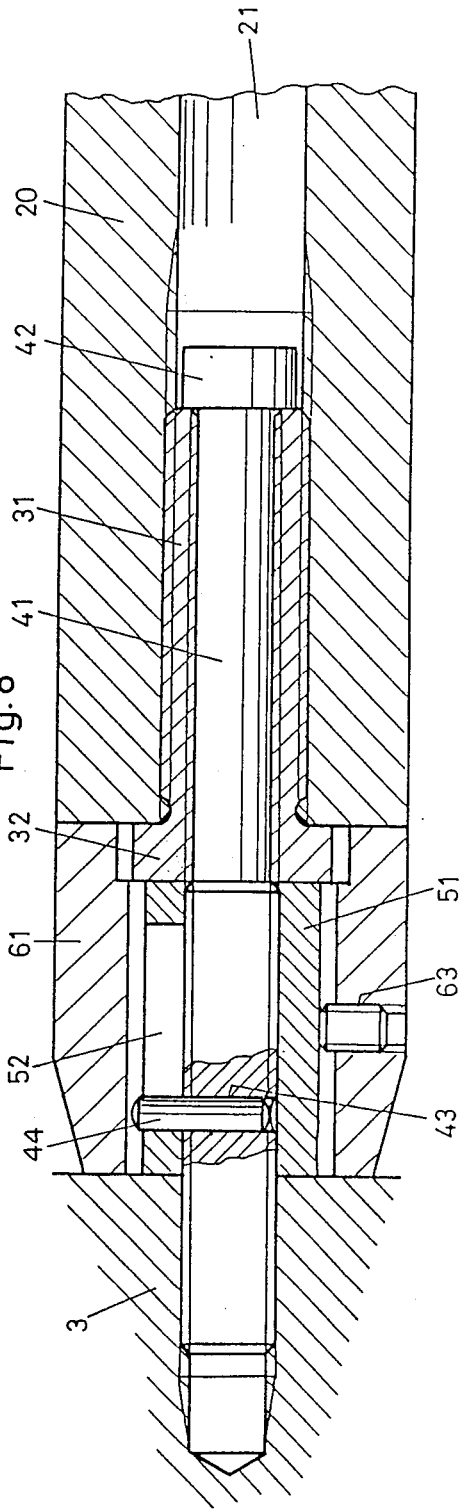

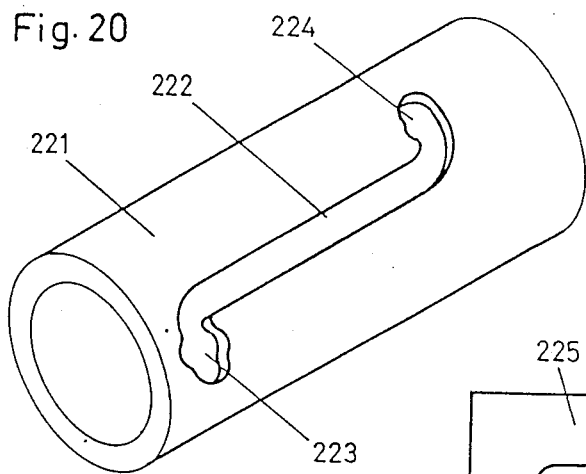
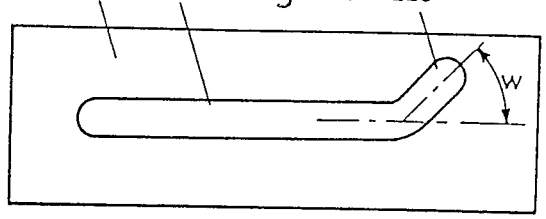
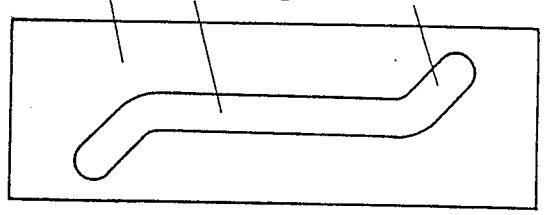
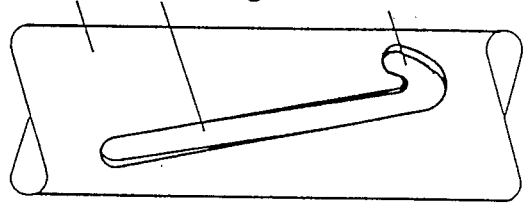
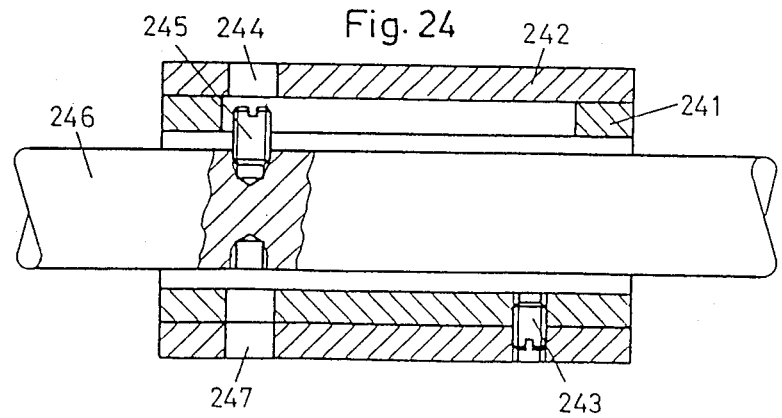

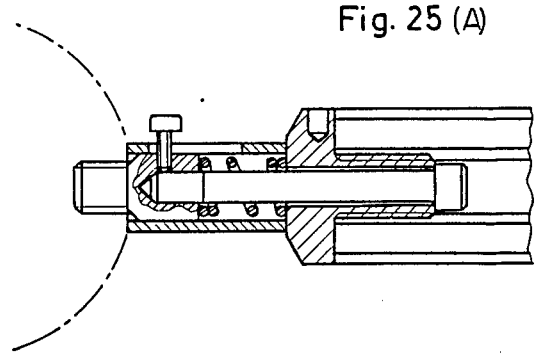 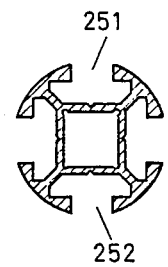
Fig. 25 (A)  Fig. 25 (B)
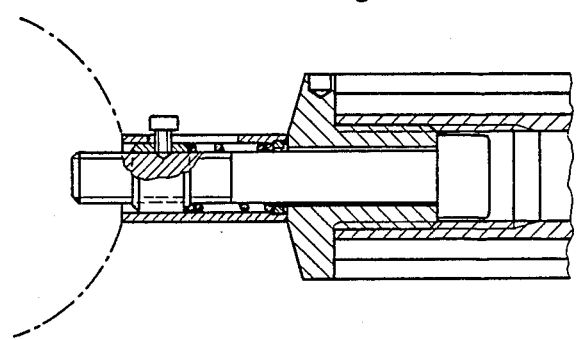 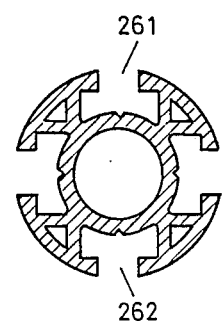
Fig. 26 (A)  Fig. 26 (B)
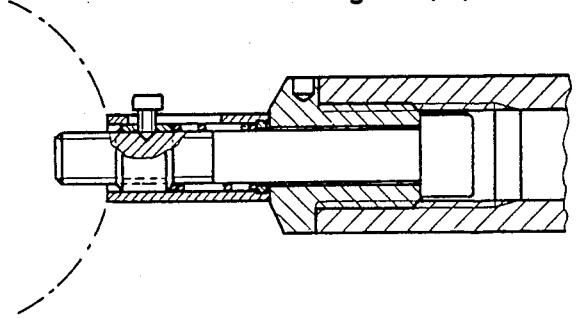 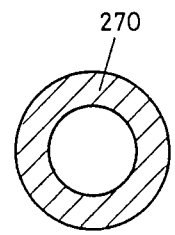
Fig. 27 (A)  Fig. 27 (B)

4,848,952

ROTARY CONNECTOR FOR SCAFFOLDING ROD

BACKGROUND OF THE INVENTION

This invention relates to a rotary connecting element for the ends of a scaffolding rod.

In conventional frames or frameworks, the ends of the scaffolding rods are detachably screwed to junction pieces, which are fastened laterally to other scaffolding rods or support columns. Sometimes in the construction of such a framework it is desired to fit a scaffolding rod between two junction pieces without having to displace them apart in order to provide space for the screws fastened to the ends of the scaffolding rod. The conventional scaffolding rods are unsuitable for such a construction.

SUMMARY OF THE INVENTION

The invention overcomes this drawback by providing a rotary connecting element for a scaffolding rod which can extend or retract the junction piece anchoring screw by turning a sleeve in which the screw, or more accurately the bolt defining it, is axially guided.

BRIEF DESCRIPTION OF THE DRAWINGS

FIG. 7 is a cross-sectional schematic view of the connecting element prior to the installation of the scaffolding rod, FIG. 8 is a corresponding view following installation, FIG. 20 is a perspective view of a guide sleeve with lateral slotted openings, offset for e slide lock, FIG. 21 is a top view of a variation of a guide sleeve in which the slotted opening has an angular end, FIG. 22 is a top view of another variation of a guide sleeve with an S-shaped lateral opening, FIG. 23 is a top view of another variation of a guide sleeve with a lateral opening terminating at an angle, FIG. 24 is a cross-sectional schematic view of a guide sleeve having a reinforcing sleeve, and FIGS. 25(A) and 25(B), FIGS. 26(A) and 26(B), and FIGS. 27(A) and 27(B) show different cross-sectional variations of a scaffolding rod.

DETAILED DESCRIPTION OF THE PREFERRED EMBODIMENTS

Figure 1:
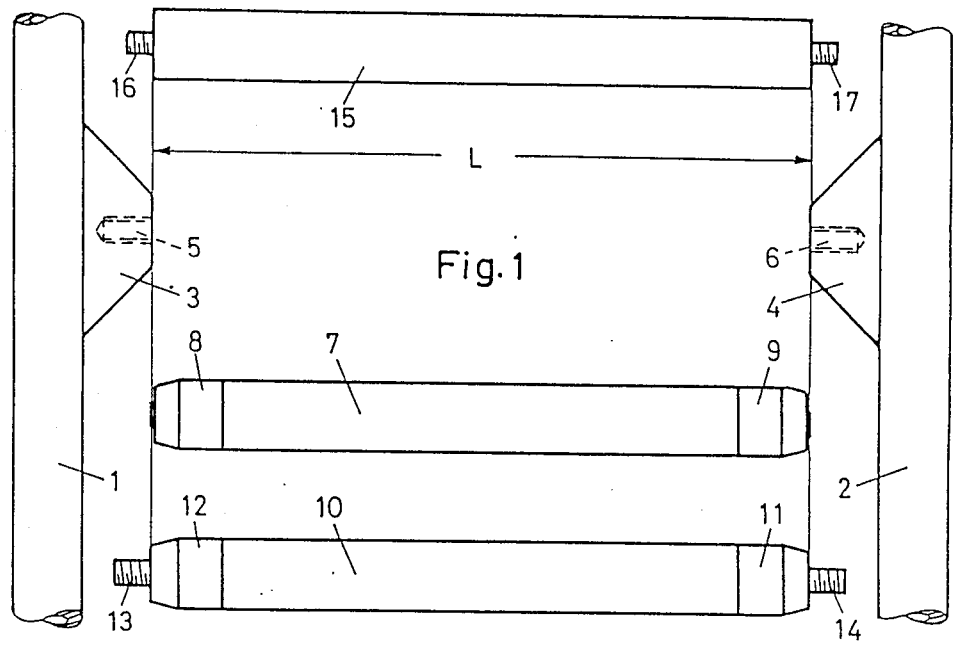
FIG. 1 is a schematic diagram showing a scaffolding rod having a connecting element in accordance with the invention in comparison with one of prior art.

FIG. 1 shows two scaffolding rods 1 and 2 to each of which a junction piece 3 or 4 is fastened. The junction piece can, for example, be half of a flat hexagonal prism which has a tapped hole in each of its three lateral faces. The scaffolding rods 1 and 2 are permanently mounted in a structure, not shown, such that the tapped holes 5 and 6 in the junction pieces 3 and 4 are coaxial.

FIG. 1 also shows a scaffolding rod 7, each of whose ends has a connecting element 8, 9 according to the invention in an opened or withdrawn state, and a scaffolding rod 10, each of whose ends has a closed or extended connecting element 11, 12. Of the connecting elements 8, 9, 11, 12 in FIG. 1, only a cover sleeve is visible out of each of which projects a screw 13 or 14 in the closed state. In comparison with a scaffolding rod of the invention having a length L in an opened state, a scaffolding rod 15 of length L according to prior art has the disadvantage that it cannot be screwed into the tapped holes 5, 6 due to the projecting screws 16 and 17 without displacing the scaffolding rod 1 and/or 2 for assembly, when the effective distance between the front faces of the junction pieces 3 and 4 is also equal to L.

In a scaffolding rod with the connecting elements of the invention, by rotating the cover sleeves 11 and 12 around their axes in one direction, the screws 13 and 14 are both axially displaced and rotate until they vanish inside the cover sleeves. In this instance the overall length of the scaffolding rod 7 with the two connecting elements 8 and 9 in an opened state is equal to L, so that without further effort it can be fitted between the junction pieces 5 and 6 in such a manner that by rotating the cover sleeves 8 and 9 in the other direction it is possible to thread the screws into the tapped holes 5 and 6. Disassembly is done by simply rotating the cover sleeves in the open direction.

Figure 2:
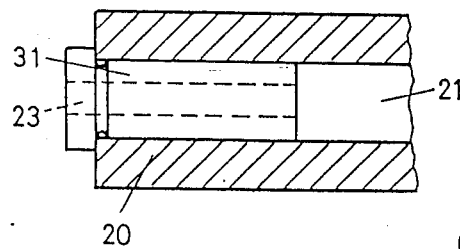
FIG. 2 is a cross-sectional schematic view of the end section of a scaffolding rod to which the threaded insert of a connecting element of the invention is fastened.

The end section of a scaffolding rod 20, illustrated in FIG. 2, has a bore 21 in which a threaded insert 31, whose axial internal bore 23 is tapped, is permanently installed. The insert 31 and the rod 20 can be assembled, for example, by gluing or screwing.

Figure 3A:
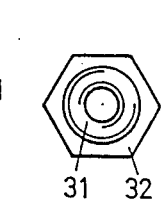
FIGS. 3A and 3B are cross-sectional and lateral detailed views of the threaded insert.
Figure 3B:
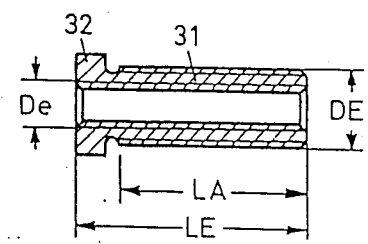

FIGS. 3A and 3B show the insert 31 in detail, which has an internal thread over its entire length LE and preferably an external thread over the length LA. One end of the insert has a hexagonal head 32.

Figure 4:
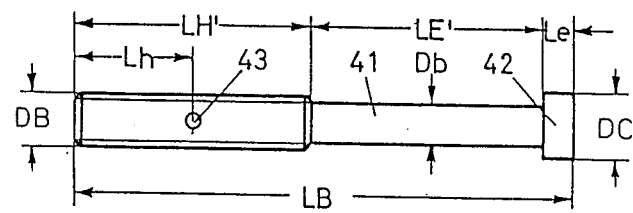
FIG. 4 is a cross-sectional view of a bolt for the connecting element.

FIG. 4 shows a bolt 41 having an overall length LB of which a length LH′ is threaded and a length LE′ is smooth. A third section of length Le defines a head 42 whose diameter is DC, and the threaded section has a through bore 43 at a distance of Lh < LH′ from the end.

Figure 5A:
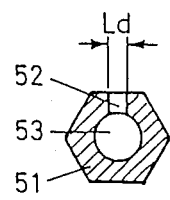
FIGS. 5A and 5B are longitudinal and cross-sectional views of a hexagonal sleeve.
Figure 5B:
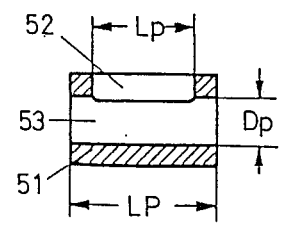

FIGS. 5A and 5B show a hexagonal sleeve 51 in the shape of an axially bored, hexagonal prism having a length LP and a lateral slot 52 having a length Lp and a width Ld. A second slot, not shown, can be provided diagonally opposite the first slot.

Figure 6:
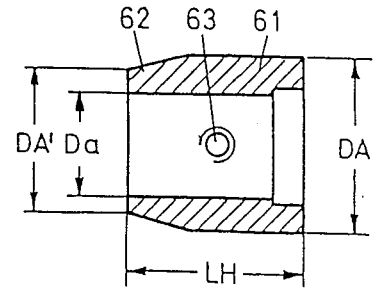
FIG. 6 is a cross-sectional view of a cover sleeve for the connecting element.

FIG. 6 shows a sectional view of a cover sleeve 61, whose outer diameter DA preferably corresponds to the outer diameter of the scaffolding rod and whose internal diameter Da is somewhat larger than the outer diameter of the hexagonal sleeve 51. One end of the cover sleeve 61 has a conical section 62 whose diameter DA' on the left face is somewhat smaller than the diameter DA. Approximately in the middle of the cover sleeve there is a tapped hole 63 through which a threaded pin, not shown in the Figure, for example an Allen screw, can be installed to permanently clamp the hexagonal sleeve 51 inside the cover sleeve.

The elements 31, 41, 51, 61 are assembled as shown in FIGS. 7 and 8; the bolt 41, whose thread diameter DB corresponds with the thread diameter De of the insert 31, is screwed into the insert before its installation in the cavity 21 of the scaffolding rod 20 until a section of the threaded length LH' projects through the insert; in this state the bolt 41 can rotate freely inside the threaded insert since the length LE' is slightly greater than the length LE and the diameter Db of the smooth section of the bolt is smaller than the diameter De.

The hexagonal sleeve 51 is then fitted over the projecting length of the bolt 41, whose outer diameter DB is smaller than the internal diameter Dp of the hexagonal sleeve, which is not threaded. In the next step a guide pin 44 is inserted through the slot 52 of the threaded insert 51 into the bore 43 of the bolt 41. The pin 44 constrains the sleeve 51 and the bolt 41 to rotate jointly, but in such a manner that the bolt moves in the axial direction. The hexagonal sleeve does not experience any axial displacement because when rotating the pin 44 is displaced within the slot 52. The cover sleeve 61 is then installed, and anchored to the sleeve 51 by an Allen screw in the hole 63. The sleeve 61 prevents the escape of the guide pin 44 but is otherwise just aesthetic. It may be omitted if the pin is fixedly secured in the bore 43.

Figure 9:
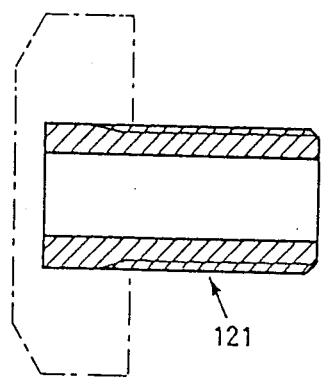
FIG. 9 is a schematic view of a second connecting element sleeve according to the invention, to be fastened to the end of a scaffolding rod.
Figure 10:
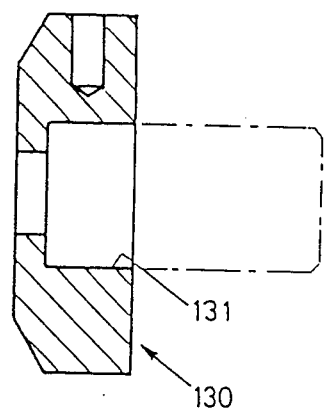
FIG. 10 is a cross-sectional, detailed view of a head for the sleeve of FIG. 9.

Referring to the second embodiment, the sleeve head 130 shown in FIG. 10 has a bore 131 in which a sleeve 121 (FIG. 9) is permanently fixed, for example by gluing or welding. The axial internal bore of the sleeve 121 is not threaded. The sleeve 121 and the head 130 form a sleeve insert similar to that of FIG. 3, which may be mounted in the end of the scaffolding rod 10 (FIG. 1) by gluing or screwing.

Figure 11:
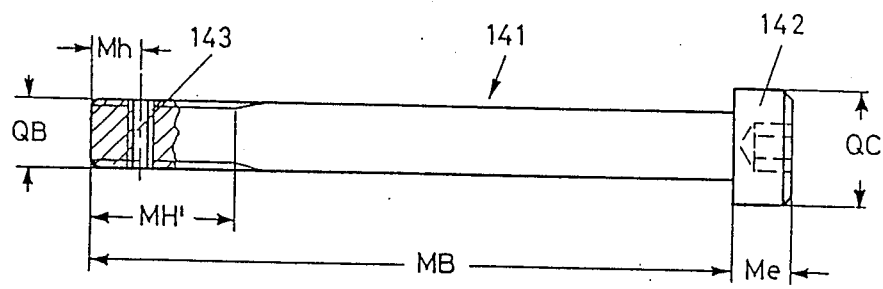
FIG. 11 is a lateral view of a bolt for the connecting element.

FIG. 11 shows a bolt 141 having a total length MB+Me, of which one section of length MH' is threaded and one section of length MB−MH' is smooth; the section of length Me defines the head 142, whose diameter is QC, and the threaded section has a threaded bore 143 at a distance of Mh<MH' from the end of the bolt.

Figure 12A:
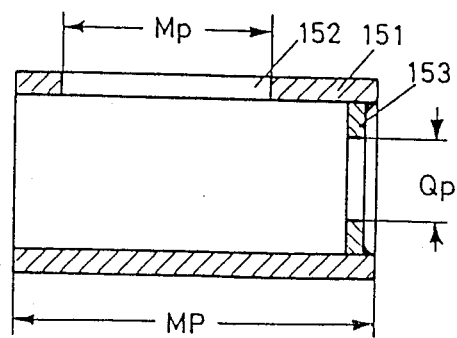
FIGS. 12A and 12B are longitudinal and cross-sectional views of a hexagonal sleeve.
Figure 12B:
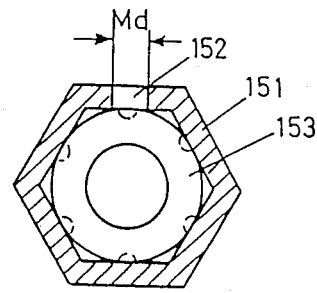

FIGS. 12A and 12B show a hexagonal guide sleeve 151 in the shape of an axially bored, hexagonal prism of length MP, which has a lateral slot 152 of length Mp and width Md. The internal bore of the prism can be round or hexagonal. On its inner face the sleeve has a collet 153 with an axial bore having a diameter Qp.

Figure 13A:
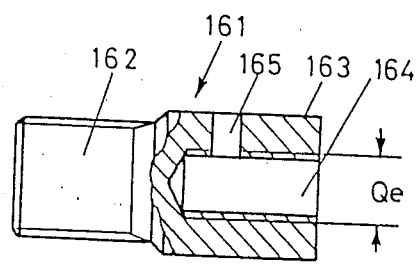
FIGS. 13A and 13B are detailed views of a screw insert.
Figure 13B:
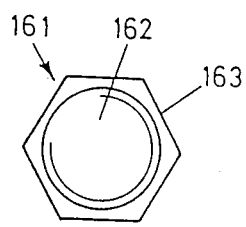

FIGS. 13A and 13B show lateral and cross-sectional views of a screw insert 161 with a threaded section 162, whose outer diameter corresponds to that of the tapped hole 5 of the scaffolding rod 1 (FIG. 1). The screw insert 161 has a hexagonal section 163 with a tapped hole 164 into which the bolt can be screwed. Approximately in the middle of the hexagonal section there is a hole 165 through which a threaded pin 171, illustrated in FIG. 14, for example a hexagonal socket-heed pin, can be inserted in order to guide the screw insert 161 in the assembled state.

Figure 14:
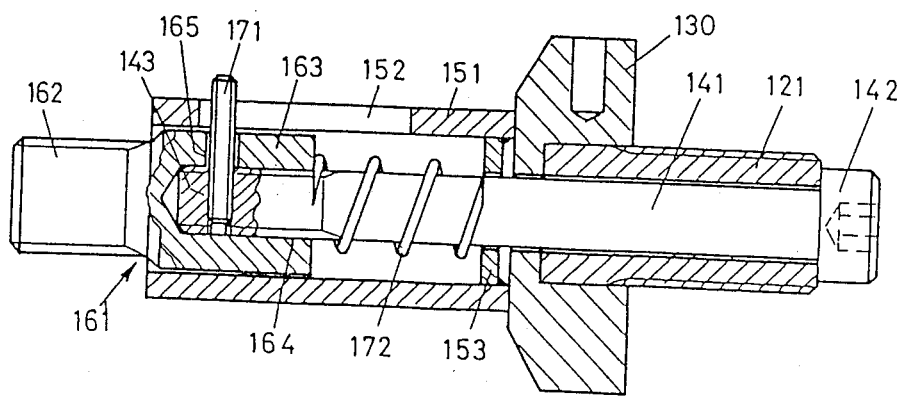
FIG. 14 is a cross-sectional schematic view of the assembled second connecting element prior to installation.

The elements 141, 151 and 161 are assembled as shown in FIG. 14; the bolt 141, whose thread diameter QB corresponds to the internal diameter Qe of the screw insert 161, is guided through the internal bore of the sleeve insert 121, 130 (FIGS. 9 and 10) before its installation until the section of length MH' extends out from the sleeve insert, whereby the bolt 141 can always rotate freely inside the sleeve insert since the internal diameter of the sleeve 121 is somewhat larger than the diameter QB of the bolt.

The hexagonal sleeve 151 is then fitted over the projecting section of the bolt 141, because the outer diameter QB of the bolt is smaller than the internal diameter Qp of the collet 153, which is not threaded. A spring 172 is then guided over the bolt 141, the bolt is screwed into the bore 164 of the screw insert 161, and the pin 171 is inserted through the slot 152, the hole 165, and screwed into the bore 143. Both the screw insert 161 and the bolt 141 can thus move together elastically axially, and can be rotated to thread the screw portion 162 of the insert into the junction piece bore 5. The hexagonal sleeve 151 does not experience any axial displacement, and is held against the head 130 by the spring.

Figure 15:
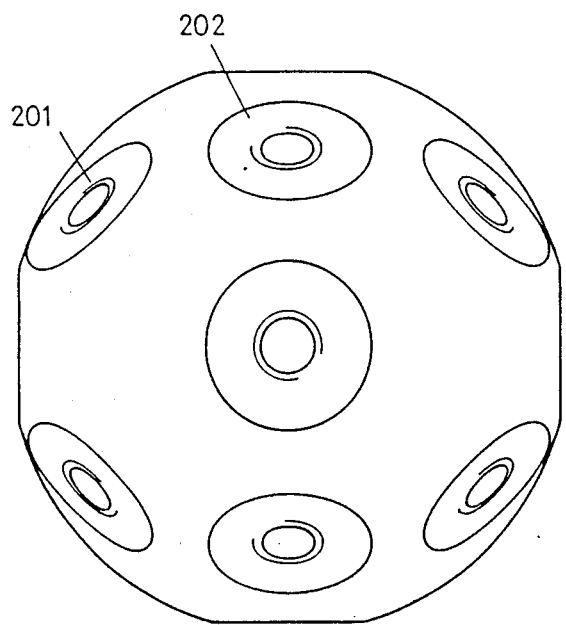
FIG. 15 is a perspective view of a spherical junction piece.

The junction piece shown in FIG. 15 has a spherical or hemispherical shape with several flattened-off areas 201, 202, each of which has a tapped hole into which a scaffolding tube or rod can be screwed to erect a three dimensional, angular framework.

Figure 16:
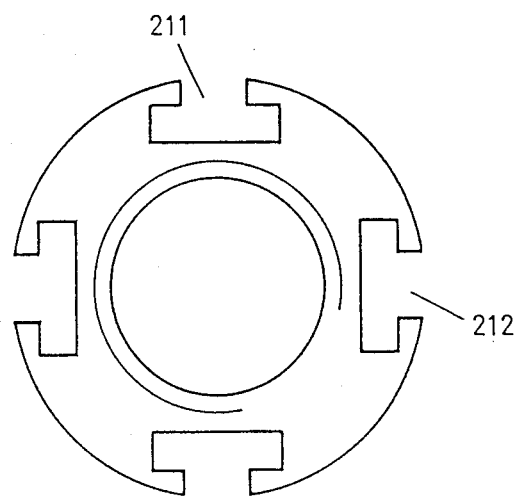
FIG. 16 is a lateral view of a scaffolding rod without a connecting element.

The tubing illustrated in FIG. 16 has a round cross-section and longitudinal grooves 211, 212. Such tubings, which can also be rectangular, are known from Swiss patent No. 588,233.

Figure 17:
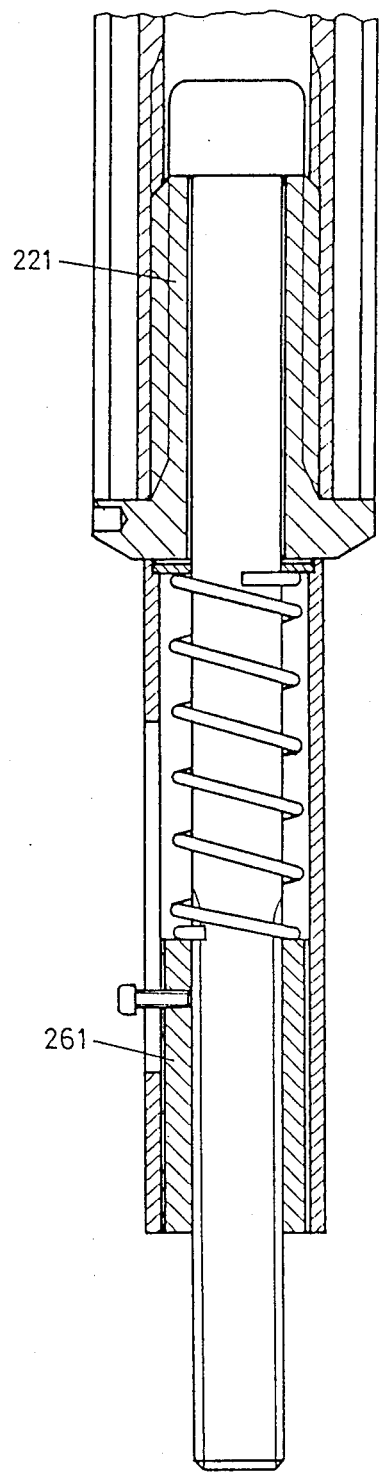
FIG. 17 is a cross-sectional schematic view of another embodiment of a connecting element.

The connecting element illustrated in FIG. 17 has a simpler guide insert 261, instead of the screw insert 161 in accordance with FIG. 13, and a modified sleeve insert 221.

In a scaffolding rod with connecting elements according to FIGS. 9 to 17, the screws 162 are spring-loaded and can be axially displaced by applying a slight pressure until they vanish inside the guide sleeve 151. In this condition the overall length of the scaffolding rod 7 with two connecting elements is equal to L so that it can be fitted between the junction pieces 3 and 4 without further effort, and by rotating the guide or cover sleeves 151 the screws 162 are threaded into the tapped holes 5 and 6. Disassembly can be done in a simple manner by rotating the cover sleeves in the opposite direction.

Figure 18:
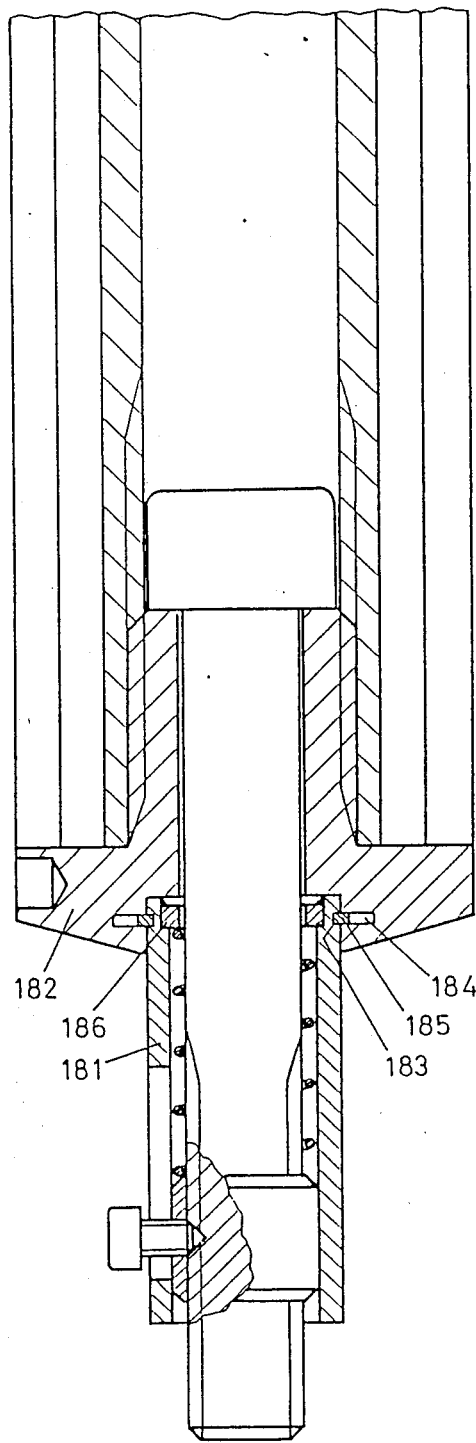
FIG. 18 is a cross-sectional schematic view of another embodiment of a connecting element in which there is a rotational connection between a guide sleeve and the sleeve head.

The connecting element according to FIG. 18 has a guide sleeve 181, which can be inserted into a central bore of the head 182 of a sleeve insert to form a rotatable snap connection by means of a spring ring 185 which can be inserted into radial slots 183, 184, whereby the collet 186 of the guide sleeve 181 can be omitted.

Figure 19:
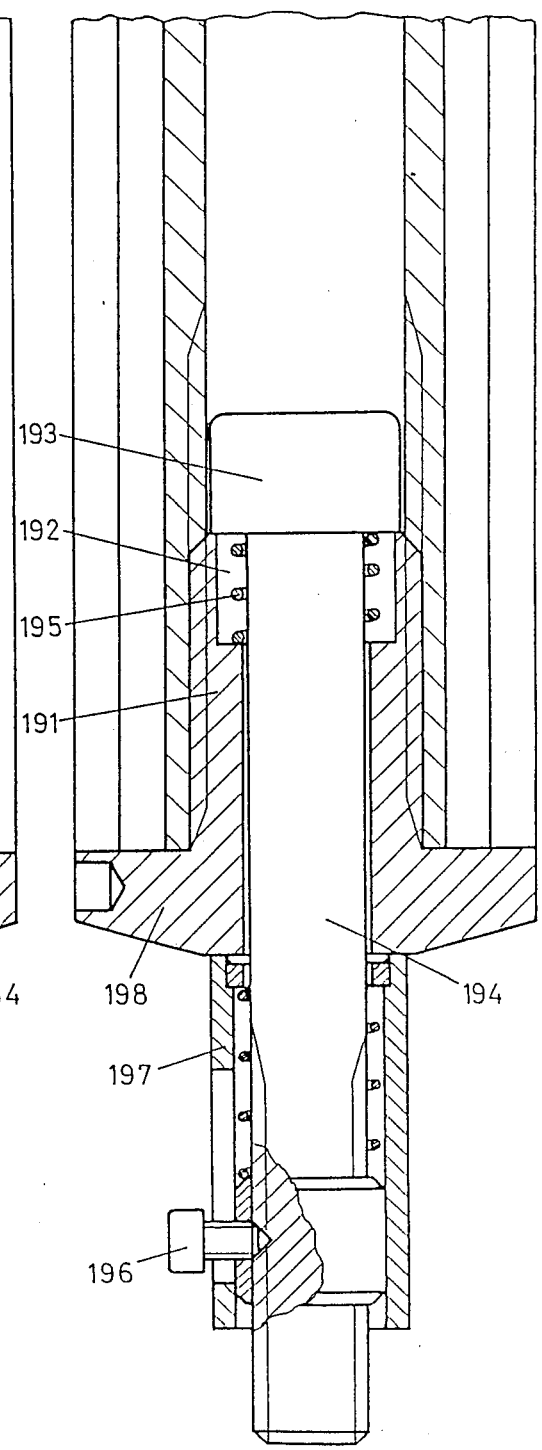
FIG. 19 is a cross-sectional view of an embodiment having two springs.

The sleeve insert of the connecting element according to FIG. 19 has an internal sleeve or bushing 191, which has a central bore 192 such that between the bottom of this bore and the head 193 of a bolt 194 a spring 195 is fitted, which can push via the bolt 194 and a threaded pin 196 a guide sleeve 197 against the head 198 of the insert in which the bushing 191 is mounted.

The guide sleeve according to FIG. 20 comprises a tubular member 221 having a lateral slot 222; the ends of the slot are extended in opposite directions, perpendicular to the axis of the sleeve. Preferably one of the elongated openings 223 has a circular recess and the other has a semi-circular recess. A guide sleeve according to FIG. 20 or a simpler one with only one elongated opening can be used instead of the sleeves 51 (FIGS. 5, 7, 8), 151 (FIGS. 12, 14), 181 (FIG. 18) and 197 (FIG. 19), and the sleeve can have a collet, not illustrated in FIG. 20, such as the one shown in FIG. 12.

In the tubular guide sleeve 225 according to FIG. 21, one end 226' of the slot 226 is bent at an angle w with respect to the sleeve axis ranging from 0° to 90°.

The tubular guide sleeve 227 according to FIG. 22 has a curved or S-shaped slot 228, and the guide sleeve 229 according to FIG. 23 has an oblique slot 230 which terminates in a hook back 231. Instead of the sleeves 51, 151, 181 and 197, the guide sleeves according to FIGS. 21 to 23 can be inserted, whereby the spring 172 and the collet 153 can be omitted, because when rotating the guide sleeves 225, 227 or 229, the pin guided in the slot portions 226', 228' or 230, is automatically displaced forward, which facilitates the screwing of the bolt into the tapped hole of a junction piece.

The reinforced sleeve according to FIG. 24 has a tubular guide sleeve 241, for example according to one of FIGS. 20 to 23, and if desired also without the extensions 223, 224, 231 (FIGS. 20, 23). The guide sleeve 241 is introduced into the cavity of a reinforcement sleeve 242 such that the outer diameter of the sleeve 241 matches the internal diameter of the reinforcement sleeve 242. The connection between the sleeves 242 and 241 can be made by gluing, pressing in, etc. If necessary, relative rotation between the two sleeves can be prevented by a screw 243. The sleeve 242 can have an opening 244 through which a guide pin 245 of a bolt 246 is accessible. In the assembled state the sleeves 241 and 242 can have a common bore 247 through which a locking screw can be threaded into the bolt 246.

A connecting element with a sleeve according to one of FIGS. 20 to 24 functions in the same manner as the abovedescribed connecting elements. The only difference is that the force required to screw the bolt 246 into the junction piece is transferred to the pin 245, which must therefore have corresponding dimensions. An additional function of the pin 171 in FIG. 14 is to enable the axial finger manipulation of the bolt 141.

The scaffolding rods according to FIGS. 25 and 26 have longitudinal slots 251, 252, or 261, 262, into which the corners of walls can be guided by a slight axial rotation of the scaffolding rod. In contrast, FIG. 27 shows a simple cylindrical scaffolding rod 270.

What is claimed is:

1. A connecting element for a scaffolding rod (20), comprising:
   (a) an elongate bolt (41; 141) rotatably mounted in a hollow end of the rod,
   (b) a guide sleeve (51; 151) having a close ended longitudinal slot (52; 152) disposed surrounding an end portion of the bolt extending outwardly from the rod,
   (c) a guide pin (44; 171) extending transversely outwardly from said end portion of the bolt and riding in the sleeve slot such that the sleeve and bolt are constrained to joint rotation by the pin with simultaneous axial displacement of the bolt within the sleeve, and
   (d) a guide insert (161; 261) connected to an outer end of the bolt and slidable within the guide sleeve to enable a threaded outer end of the guide insert to be screwed into a tapped bore (5) of a framework junction piece (3).

2. A connecting element according to claim 1, further comprising a sleeve insert (31; 130, 121) permanently connected to said end of the rod and having an axial bore through which the bolt extends, and a head (42; 142) defined on an inner end of the bolt for preventing its escape from the insert.

3. A connecting element according to claim 2, wherein the bolt has a smooth section (LE') longer than the sleeve insert.

4. A connecting element according to claim 1, further comprising a compression spring (172) disposed around the bolt and bearing against a collet (153) of the guide sleeve and the guide insert to urge the guide sleeve against the sleeve insert.

5. A connecting element according to claim 4, wherein the guide pin extends through a bore (165) of the guide insert (161).

6. A connecting element according to claim 1, wherein the guide sleeve and guide insert having polygonal cross-sections.

7. A connecting element for a scaffolding rod (20), comprising:
   (a) an elongate bolt (41; 141) rotatably mounted in a hollow end of the rod,
   (b) a guide sleeve (51; 151) having a close ended longitudinal slot (52; 152) disposed surrounding an end portion of the bolt extending outwardly from the rod, and
   (c) a guide pin (44; 171) extending transversely outwardly from said end portion of the bolt and riding in the sleeve slot such that the sleeve and bolt are constrained to joint rotation by the pin with simultaneous axial displacement of the bolt within the sleeve to enable a threaded outer end of the bolt to be screwed into a tapped bore (5) of a framework junction piece (3),
   (d) wherein the guide sleeve slot (222; 226; 228; 230) has an angled extension (224; 226'; 228'; 231) on one end.

8. A connecting element according to claim 7, wherein the guide sleeve (241) is surrounded by a reinforcing sleeve (242).

9. A connecting element for a scaffolding rod (20), comprising:
   (a) an elongate bolt (41; 141) rotatably mounted in a hollow end of the rod,
   (b) a guide sleeve (51; 151) having a close ended longitudinal slot (52; 152) disposed surrounding an end portion of the bolt extending outwardly from the rod,
   (c) a guide pin (44; 171) extending transversely outwardly from said end portion of the bolt and riding in the sleeve slot such that the sleeve and bolt are constrained to joint rotation by the pin with simultaneous axial displacement of the bolt within the sleeve to enable a threaded outer end of the bolt to be screwed into a tapped bore (5) of a framework junction piece (3), and
   (d) a cover sleeve (61) surrounding the guide sleeve and anchored (63) thereto.

* * * * *